United States Patent
Zhou et al.

(10) Patent No.: US 12,058,108 B2
(45) Date of Patent: Aug. 6, 2024

(54) SHARING OF FIREWALL RULES AMONG MULTIPLE WORKLOADS IN A HYPERVISOR

(71) Applicant: VMware LLC, Palo Alto, CA (US)

(72) Inventors: Jingmin Zhou, Los Gatos, CA (US); David Lorenzo, Redwood City, CA (US); Subrahmanyam Manuguri, San Jose, CA (US); Anirban Sengupta, Saratoga, CA (US)

(73) Assignee: VMware LLC, Palo Alto, CA (US)

( * ) Notice: Subject to any disclaimer, the term of this patent is extended or adjusted under 35 U.S.C. 154(b) by 52 days.

(21) Appl. No.: 17/723,191

(22) Filed: Apr. 18, 2022

(65) Prior Publication Data
US 2022/0239635 A1 Jul. 28, 2022

Related U.S. Application Data (63) Continuation of application No. 16/352,577, filed on Mar. 13, 2019, now Pat. No. 11,310,202.

(51) Int. Cl.
*H04L 9/40* (2022.01)
*G06F 9/455* (2018.01)
*G06F 16/901* (2019.01)

(52) U.S. Cl.
CPC ...... *H04L 63/0263* (2013.01); *G06F 9/45558* (2013.01); *G06F 16/9024* (2019.01); *H04L 63/0218* (2013.01); *G06F 2009/45587* (2013.01)

(58) Field of Classification Search
CPC ............. H04L 63/0263; H04L 63/0218; G06F 9/45558; G06F 9/45533; G06F 16/9024; G06F 2009/45587
See application file for complete search history.

(56) References Cited

U.S. PATENT DOCUMENTS 5,581,722 A 12/1996 Welland
5,968,176 A 10/1999 Nessett et al.
(Continued)

FOREIGN PATENT DOCUMENTS

EP 2748750 A1 7/2014
JP 2003188906 A 7/2003
(Continued)

OTHER PUBLICATIONS

Author Unknown, "CISCO Identity-Based Firewall Security," Month Unknown 2011, 2 pages, CISCO Systems, Inc.
(Continued)

*Primary Examiner* — Lynn D Feild
*Assistant Examiner* — Abdullah Almamun
(74) *Attorney, Agent, or Firm* — Quarles & Brady LLP (57) ABSTRACT

In some embodiments, a method receives a packet at an instance of a distributed firewall associated with one of a plurality of workloads running on a hypervisor. Each of the plurality of workloads has an associated instance of the distributed firewall. An index table is accessed for the workload where the index table includes a set of references to a set of rules in a rules table. Each workload in the plurality of workloads is associated with an index table that references rules that are applicable to each respective workload. The method then accesses at least one rule in a set of rules associated with the set of references from the rules table and compares one or more attributes for the packet to information stored for the at least one rule in the set of rules to determine a rule in the set of rules to apply to the packet.

18 Claims, 4 Drawing Sheets

(56) References Cited

U.S. PATENT DOCUMENTS

| | | | |
|---|---|---|---|
| 6,098,172 | A | 8/2000 | Coss et al. |
| 6,154,775 | A | 11/2000 | Coss et al. |
| 6,170,012 | B1 | 1/2001 | Coss et al. |
| 6,219,786 | B1 | 4/2001 | Cunningham et al. |
| 6,496,935 | B1 | 12/2002 | Fink et al. |
| 6,600,744 | B1 | 7/2003 | Carr et al. |
| 6,708,187 | B1 | 3/2004 | Shanumgam et al. |
| 6,880,089 | B1 | 4/2005 | Bommareddy et al. |
| 7,032,022 | B1 | 4/2006 | Shanumgam et al. |
| 7,055,173 | B1 | 5/2006 | Chaganty et al. |
| 7,106,756 | B1 | 9/2006 | Donovan et al. |
| 7,227,842 | B1 | 6/2007 | Ji et al. |
| 7,349,382 | B2 | 3/2008 | Marimuthu et al. |
| 7,657,887 | B2 | 2/2010 | Kothandaraman et al. |
| 7,676,836 | B2 | 3/2010 | Prigent et al. |
| 7,724,740 | B1 | 5/2010 | Wang et al. |
| 7,818,452 | B2 | 10/2010 | Matthews et al. |
| 7,831,826 | B2 | 11/2010 | Koti et al. |
| 7,894,480 | B1 | 2/2011 | Wang et al. |
| 7,948,986 | B1 | 5/2011 | Ghosh et al. |
| 7,954,143 | B2 | 5/2011 | Aaron |
| 8,032,933 | B2 | 10/2011 | Turley et al. |
| 8,065,725 | B2 | 11/2011 | Zheng et al. |
| 8,190,767 | B1 | 5/2012 | Maufer et al. |
| 8,365,294 | B2 | 1/2013 | Ross |
| 8,578,500 | B2 | 11/2013 | Long |
| 8,621,552 | B1 | 12/2013 | Lotem et al. |
| 8,660,129 | B1 | 2/2014 | Brendel et al. |
| 8,806,605 | B1 | 8/2014 | Chickering |
| 8,813,209 | B2 | 8/2014 | Bhattacharya et al. |
| 8,904,511 | B1 | 12/2014 | O'Neill et al. |
| 9,015,823 | B2 | 4/2015 | Koponen et al. |
| 9,021,546 | B1* | 4/2015 | Banerjee ............... H04L 63/102 718/1 |
| 9,047,109 | B1 | 6/2015 | Wang et al. |
| 9,130,901 | B2 | 9/2015 | Lee |
| 9,154,462 | B2 | 10/2015 | Grimes et al. |
| 9,215,210 | B2 | 12/2015 | Raman et al. |
| 9,215,213 | B2 | 12/2015 | Bansal et al. |
| 9,215,214 | B2 | 12/2015 | Bansal et al. |
| 9,276,904 | B2 | 3/2016 | Bansal et al. |
| 9,367,257 | B2 | 6/2016 | Hamilton et al. |
| 9,369,431 | B1 | 6/2016 | Kirby et al. |
| 9,479,464 | B1 | 10/2016 | Wang et al. |
| 9,553,806 | B2 | 1/2017 | Anand |
| 9,614,748 | B1 | 4/2017 | Battersby et al. |
| 9,621,516 | B2 | 4/2017 | Basak et al. |
| 9,680,706 | B2 | 6/2017 | Masurekar et al. |
| 9,755,903 | B2 | 9/2017 | Masurekar et al. |
| 9,774,537 | B2 | 9/2017 | Jain et al. |
| 9,774,707 | B2 | 9/2017 | Parthasarathy et al. |
| 9,806,948 | B2 | 10/2017 | Masurekar et al. |
| 9,860,279 | B2 | 1/2018 | Jain et al. |
| 9,894,103 | B2 | 2/2018 | Kwok et al. |
| 9,906,560 | B2 | 2/2018 | Jain et al. |
| 9,906,561 | B2 | 2/2018 | Jain et al. |
| 9,906,562 | B2 | 2/2018 | Jain et al. |
| 10,135,727 | B2 | 11/2018 | Gude et al. |
| 10,148,696 | B2 | 12/2018 | Nimmagadda et al. |
| 10,264,021 | B2 | 4/2019 | Bansal et al. |
| 10,348,685 | B2 | 7/2019 | Chalvadi et al. |
| 10,484,334 | B1 | 11/2019 | Lee et al. |
| 10,701,104 | B2* | 6/2020 | Malkov ............... H04L 63/1408 |
| 10,873,595 | B1 | 12/2020 | Oliphant et al. |
| 10,944,722 | B2 | 3/2021 | Popuri et al. |
| 11,005,815 | B2 | 5/2021 | Chalvadi et al. |
| 11,082,400 | B2 | 8/2021 | Bansal et al. |
| 11,088,990 | B2 | 8/2021 | Bansal et al. |
| 11,115,382 | B2 | 9/2021 | Bansal et al. |
| 11,122,085 | B2 | 9/2021 | Bansal et al. |
| 11,128,600 | B2 | 9/2021 | Bansal et al. |
| 11,171,920 | B2 | 11/2021 | Bansal et al. |
| 11,258,761 | B2 | 2/2022 | Bansal et al. |
| 11,310,202 | B2 | 4/2022 | Zhou et al. |
| 11,425,095 | B2 | 8/2022 | Popuri et al. |
| 2002/0078370 | A1 | 6/2002 | Tahan |
| 2003/0041266 | A1 | 2/2003 | Ke et al. |
| 2003/0093481 | A1 | 5/2003 | Mitchell et al. |
| 2003/0120955 | A1 | 6/2003 | Bartal et al. |
| 2003/0126468 | A1 | 7/2003 | Markham |
| 2003/0226027 | A1 | 12/2003 | Marquet et al. |
| 2004/0049701 | A1 | 3/2004 | Pennec et al. |
| 2004/0177276 | A1 | 9/2004 | MacKinnon et al. |
| 2004/0223495 | A1 | 11/2004 | Pachl |
| 2004/0243835 | A1 | 12/2004 | Terzis et al. |
| 2004/0255151 | A1 | 12/2004 | Mei et al. |
| 2004/0268150 | A1 | 12/2004 | Aaron |
| 2005/0078601 | A1 | 4/2005 | Moll et al. |
| 2005/0190909 | A1 | 9/2005 | Yoneyama et al. |
| 2005/0198125 | A1 | 9/2005 | Beck et al. |
| 2005/0210291 | A1 | 9/2005 | Miyawaki et al. |
| 2005/0262554 | A1 | 11/2005 | Brooks et al. |
| 2005/0276262 | A1 | 12/2005 | Schuba et al. |
| 2005/0278431 | A1 | 12/2005 | Goldschmidt et al. |
| 2006/0013136 | A1 | 1/2006 | Goldschmidt et al. |
| 2006/0129808 | A1 | 6/2006 | Koti et al. |
| 2006/0168213 | A1 | 7/2006 | Richardson et al. |
| 2006/0195896 | A1 | 8/2006 | Fulp et al. |
| 2007/0028291 | A1 | 2/2007 | Brennan et al. |
| 2007/0061492 | A1 | 3/2007 | Riel |
| 2007/0118893 | A1 | 5/2007 | Crawford |
| 2007/0136813 | A1 | 6/2007 | Wong |
| 2008/0072305 | A1 | 3/2008 | Casado et al. |
| 2008/0082977 | A1 | 4/2008 | Araujo et al. |
| 2008/0115190 | A1 | 5/2008 | Aaron |
| 2008/0148382 | A1 | 6/2008 | Bartholomy et al. |
| 2008/0189769 | A1 | 8/2008 | Casado et al. |
| 2008/0215518 | A1 | 9/2008 | Matsuda |
| 2008/0267177 | A1 | 10/2008 | Johnson et al. |
| 2008/0289026 | A1 | 11/2008 | Abzarian et al. |
| 2008/0289028 | A1 | 11/2008 | Jansen et al. |
| 2008/0298274 | A1 | 12/2008 | Takashige et al. |
| 2009/0007219 | A1 | 1/2009 | Abzarian et al. |
| 2009/0007251 | A1 | 1/2009 | Abzarian et al. |
| 2009/0083727 | A1 | 3/2009 | Fu et al. |
| 2009/0129271 | A1 | 5/2009 | Ramankutty et al. |
| 2009/0150521 | A1 | 6/2009 | Tripathi |
| 2009/0172800 | A1* | 7/2009 | Wool ............... G06F 21/604 726/11 |
| 2009/0185568 | A1 | 7/2009 | Cho et al. |
| 2009/0228972 | A1 | 9/2009 | Bandi et al. |
| 2009/0235325 | A1 | 9/2009 | Dimitrakos et al. |
| 2009/0249436 | A1 | 10/2009 | Coles et al. |
| 2009/0249438 | A1 | 10/2009 | Litvin et al. |
| 2009/0249470 | A1 | 10/2009 | Litvin et al. |
| 2009/0249472 | A1 | 10/2009 | Litvin et al. |
| 2009/0276771 | A1 | 11/2009 | Nickolov et al. |
| 2009/0327198 | A1 | 12/2009 | Farah |
| 2009/0327781 | A1 | 12/2009 | Tripathi |
| 2010/0037310 | A1 | 2/2010 | Turley et al. |
| 2010/0037311 | A1 | 2/2010 | He et al. |
| 2010/0037331 | A1 | 2/2010 | Blake et al. |
| 2010/0043067 | A1 | 2/2010 | Varadhan et al. |
| 2010/0100616 | A1 | 4/2010 | Bryson et al. |
| 2010/0100949 | A1 | 4/2010 | Sonwane et al. |
| 2010/0125667 | A1 | 5/2010 | Soundararajan |
| 2010/0180331 | A1 | 7/2010 | Murakami et al. |
| 2010/0192215 | A1 | 7/2010 | Yaxuan et al. |
| 2010/0333165 | A1 | 12/2010 | Basak et al. |
| 2011/0016467 | A1 | 1/2011 | Kane |
| 2011/0022695 | A1 | 1/2011 | Dalal et al. |
| 2011/0055916 | A1 | 3/2011 | Ahn |
| 2011/0072486 | A1 | 3/2011 | Hadar et al. |
| 2011/0103259 | A1 | 5/2011 | Aybay et al. |
| 2011/0113467 | A1 | 5/2011 | Agarwal et al. |
| 2011/0154470 | A1 | 6/2011 | Grimes et al. |
| 2011/0213875 | A1 | 9/2011 | Ferris et al. |
| 2011/0246637 | A1 | 10/2011 | Murakami |
| 2011/0302647 | A1 | 12/2011 | Bhattacharya et al. |
| 2012/0042033 | A1 | 2/2012 | Ayala, Jr. et al. |
| 2012/0137199 | A1 | 5/2012 | Liu |
| 2012/0180104 | A1 | 7/2012 | Gronich et al. |
| 2012/0240182 | A1 | 9/2012 | Narayanaswamy et al. |
| 2012/0263049 | A1 | 10/2012 | Venkatachalapathy et al. |

(56) References Cited

U.S. PATENT DOCUMENTS

| | | |
|---|---|---|
| 2012/0291024 A1 | 11/2012 | Barabash et al. |
| 2012/0314617 A1 | 12/2012 | Erichsen et al. |
| 2013/0007740 A1 | 1/2013 | Kikuchi et al. |
| 2013/0019277 A1 | 1/2013 | Chang et al. |
| 2013/0031544 A1 | 1/2013 | Sridharan et al. |
| 2013/0047151 A1 | 2/2013 | Sridharan et al. |
| 2013/0073743 A1 | 3/2013 | Ramasamy et al. |
| 2013/0074066 A1 | 3/2013 | Sanzgiri et al. |
| 2013/0125230 A1 | 5/2013 | Koponen et al. |
| 2013/0163594 A1 | 6/2013 | Sharma et al. |
| 2013/0198355 A1 | 8/2013 | Kalyanaraman et al. |
| 2013/0219384 A1 | 8/2013 | Srinivasan et al. |
| 2013/0227097 A1 | 8/2013 | Yasuda et al. |
| 2013/0227550 A1 | 8/2013 | Weinstein et al. |
| 2013/0311358 A1 | 11/2013 | Sethi et al. |
| 2013/0311612 A1 | 11/2013 | Dickinson |
| 2013/0332983 A1 | 12/2013 | Koorevaar et al. |
| 2014/0068602 A1 | 3/2014 | Gember et al. |
| 2014/0108319 A1 | 4/2014 | Klauser et al. |
| 2014/0115578 A1 | 4/2014 | Cooper et al. |
| 2014/0149794 A1 | 5/2014 | Shetty et al. |
| 2014/0195666 A1 | 7/2014 | Dumitriu et al. |
| 2014/0245423 A1 | 8/2014 | Lee |
| 2014/0281030 A1 | 9/2014 | Cui et al. |
| 2014/0282855 A1 | 9/2014 | Clark et al. |
| 2014/0282889 A1 | 9/2014 | Ishaya et al. |
| 2014/0297780 A1 | 10/2014 | Zhou et al. |
| 2014/0304387 A1 | 10/2014 | Bansal et al. |
| 2014/0325037 A1 | 10/2014 | Elisha |
| 2015/0052521 A1 | 2/2015 | Raghu |
| 2015/0095970 A1 | 4/2015 | Shetty |
| 2015/0112933 A1 | 4/2015 | Satapathy |
| 2015/0163200 A1 | 6/2015 | Chang et al. |
| 2015/0193466 A1 | 7/2015 | Luft |
| 2015/0200816 A1 | 7/2015 | Yung et al. |
| 2015/0229641 A1 | 8/2015 | Sun et al. |
| 2015/0237013 A1 | 8/2015 | Bansal et al. |
| 2015/0237014 A1 | 8/2015 | Bansal et al. |
| 2015/0237015 A1 | 8/2015 | Bansal et al. |
| 2015/0277949 A1 | 10/2015 | Loh et al. |
| 2016/0050117 A1 | 2/2016 | Voellmy et al. |
| 2016/0050141 A1 | 2/2016 | Wu et al. |
| 2016/0065627 A1 | 3/2016 | Pearl et al. |
| 2016/0094456 A1 | 3/2016 | Jain et al. |
| 2016/0094643 A1 | 3/2016 | Jain et al. |
| 2016/0105333 A1 | 4/2016 | Lenglet et al. |
| 2016/0112374 A1 | 4/2016 | Branca |
| 2016/0149863 A1 | 5/2016 | Walker et al. |
| 2016/0156591 A1 | 6/2016 | Zhou et al. |
| 2016/0182454 A1 | 6/2016 | Phonsa et al. |
| 2016/0191466 A1 | 6/2016 | Pernicha |
| 2016/0191570 A1 | 6/2016 | Bansal et al. |
| 2016/0241702 A1 | 8/2016 | Chandra et al. |
| 2017/0004192 A1 | 1/2017 | Masurekar et al. |
| 2017/0005867 A1 | 1/2017 | Masurekar et al. |
| 2017/0005987 A1 | 1/2017 | Masurekar et al. |
| 2017/0005988 A1 | 1/2017 | Bansal et al. |
| 2017/0026283 A1 | 1/2017 | Williams et al. |
| 2017/0064749 A1 | 3/2017 | Jain et al. |
| 2017/0104720 A1 | 4/2017 | Bansal et al. |
| 2017/0118173 A1 | 4/2017 | Arramreddy et al. |
| 2017/0134422 A1 | 5/2017 | Shieh et al. |
| 2017/0134436 A1 | 5/2017 | Agarwal et al. |
| 2017/0171362 A1 | 6/2017 | Bolotov et al. |
| 2017/0180319 A1 | 6/2017 | Nimmagadda et al. |
| 2017/0180320 A1 | 6/2017 | Nimmagadda et al. |
| 2017/0180321 A1 | 6/2017 | Nimmagadda et al. |
| 2017/0180423 A1 | 6/2017 | Nimmagadda et al. |
| 2017/0187679 A1 | 6/2017 | Basak et al. |
| 2017/0250869 A1 | 8/2017 | Voellmy |
| 2017/0317928 A1 | 11/2017 | Gude et al. |
| 2017/0317976 A1 | 11/2017 | Chalvadi et al. |
| 2017/0317977 A1 | 11/2017 | Popuri et al. |
| 2017/0317979 A1 | 11/2017 | Bansal et al. |
| 2017/0318055 A1 | 11/2017 | Popuri et al. |
| 2018/0007000 A1 | 1/2018 | Bansal et al. |
| 2018/0007007 A1 | 1/2018 | Bansal et al. |
| 2018/0007008 A1 | 1/2018 | Bansal et al. |
| 2019/0182213 A1* | 6/2019 | Saavedra ............ H04L 63/0236 |
| 2019/0207983 A1 | 7/2019 | Bansal et al. |
| 2019/0319925 A1 | 10/2019 | Chalvadi et al. |
| 2020/0296078 A1 | 9/2020 | Zhou et al. |
| 2021/0409453 A1 | 12/2021 | Kaushal et al. |

FOREIGN PATENT DOCUMENTS

| | | | |
|---|---|---|---|
| JP | 2006040274 A | 2/2006 | |
| JP | 2009017269 A | 1/2009 | |
| JP | 2013012865 A | 1/2013 | |
| KR | 20080100620 A | 11/2008 | |
| WO | 2002056562 A1 | 7/2002 | |
| WO | WO-02056562 A1 * | 7/2002 | ......... H04L 63/0227 |
| WO | 2008095010 A1 | 8/2008 | |
| WO | 2013074828 A1 | 5/2013 | |

OTHER PUBLICATIONS

Author Unknown, "AppLogic Features," Jul. 2007, 2 pages, 3TERA, Inc.
Author Unknown, "Enabling Service Chaining on Cisco Nexus 1000V Series," Month Unknown, 2012, 25 pages, CISCO.
Author Unknown, "Next-Generation Firewalls," Month Unknown 2013, 1 page, Palo Alto Networks.
Basak, Debashis, et al., "Virtualizing Networking and Security in the Cloud," Month Unknown 2010, 9 pages, VMware, Inc., Palo Alto, CA.
Casado, Martin, et al., "SANE: A Protection Architecture for Enterprise Networks," Proceedings of the 15th USENIX Security Symposium, Jul. 31-Aug. 4, 2006, 15 pages, USENIX, Vancouver, Canada.
Dixon, Colin, et al., "An End to the Middle," Proceedings of the 12th Conference on Hot Topics in Operating Systems, May 2009, 5 pages, USENIX Association, Berkeley, CA, USA.
Dumitriu, Dan Mihai, et al., (U.S. Appl. No. 61/514,990), filed Aug. 4, 2011, 31 pages.
Guichard, J., et al., "Network Service Chaining Problem Statement," Network Working Group, Jun. 13, 2013, 14 pages, Cisco Systems, Inc.
Haim, Roie Ben, "NSX Distributed Firewall Deep Dive," Route to Cloud, Apr. 30, 2015, 52 pages.
Herndon, Joseph, "*FairWarning IP, LLC* v. *Iatric Systems, Inc.* (Fed. Cir. 2016)," Oct. 13, 2016, 3 pages.
Ioannidis, Sotiris, et al., "Implementing a Distributed Firewall," CCS '00, Month Unknown 2000, 10 pages, ACM, Athens, Greece.
Joseph, Dilip Anthony, et al., "A Policy-aware Switching Layer for Data Centers," Jun. 24, 2008, 26 pages, Electrical Engineering and Computer Sciences, University of California, Berkeley, CA, USA.
Mayer, Alain, et al., "Offline Firewall Analysis," International Journal of information Security, Jun. 16, 2005, 20 pages, vol. 5, Issue 3, Springer-Verlag.
Scarfone, Karen, et al., "Guidelines on Firewalls and Firewall Policy: Recommendations of the National Institute of Standards and Technology," Special Publication 800-41, Revision 1, Sep. 2009, 48 pages, NIST, U.S. Department of Commerce.
Sekar, Vyas, et al., "Design and Implementation of a Consolidated Middlebox Architecture," 9th USENIX Symposium on Networked Systems Design and Implementation, Apr. 25-27, 2012, 14 pages, USENIX, San Jose, CA, USA.
Sherry, Justine, et al., "Making Middleboxes Someone Else's Problem: Network Processing as a Cloud Service," In Proc. of SIGCOMM '12, Aug. 13-17, 2012, 12 pages, Helsinki, Finland.
Stojanovski, Nenad, et al., "Analysis of Identity Based Firewall Systems," Jun. 2010, 9 pages.
Stojanovski, Nenad, et al., "Architecture Of A Identity Based Firewall System," Jul. 2011, 9 pages.

(56) References Cited

OTHER PUBLICATIONS

Thames, J. Lane, et al., "A Distributed Firewall and Active Response Architecture Providing Preemptive Protection," ACM-SE '08, Mar. 28-29, 2008, 6 pages, Auburn, AL, USA.

* cited by examiner

SHARING OF FIREWALL RULES AMONG MULTIPLE WORKLOADS IN A HYPERVISOR

CLAIM OF BENEFIT TO PRIOR APPLICATION

This application is a continuation application of U.S. patent application Ser. No. 16/352,577, filed Mar. 13, 2019, now published as U.S. Patent Publication 2020/0296078. U.S. patent application Ser. No. 16/352,577, now published as U.S. Patent Publication 2020/0296078, is incorporated herein by reference.

BACKGROUND

Multiple workloads often run on a single hypervisor on a host computing machine. A distributed firewall may be distributed across the multiple workloads on the host and enforce rules close to the source of traffic for the workloads. Each individual workload may have its own copy of firewall rules that are stored in the hypervisor kernel to enforce different policies, such as a security policy. Often, multiple workloads on the same hypervisor have some common firewall rules in their own copy of the rules. This may be because the workloads are executing similar functionality on the same hypervisor. For example, a company may put workloads that are performing the same or similar functions on a single host. Even though there are common firewall rules, the distributed firewall stores a separate set of firewall rules for each workload. This consumes a large amount of memory in the hypervisor, which may limit the number of firewall rules that a hypervisor can support.

DETAILED DESCRIPTION

In the following description, for purposes of explanation, numerous examples and specific details are set forth in order to provide a thorough understanding of embodiments of the present disclosure. Some embodiments as expressed in the claims may include some or all of the features in these examples, alone or in combination with other features described below, and may further include modifications and equivalents of the features and concepts described herein.

A hypervisor on a host computing device receives a copy of firewall rules for a group of workloads running on that hypervisor. The hypervisor may store a single copy of the firewall rules in the hypervisor for the group. Each workload may have an associated set of firewall rules where different workloads may apply a different set of firewall rules. Instead of storing a distinct copy of the firewall rules for each workload, the hypervisor stores a list of references to the firewall rules in an index table for each workload. The index table includes references to rules in a rules table. For example, a first index table for a first workload may include a first set of references that reference a first set of rules in the rules table and a second index table for a second workload may include a second set of references that reference a second set of rules in the rules table. The first set of references and the second set of references may include different references to rules, such as the first set of references may reference rules R1, R2, and R3, and the second set of references may reference rules R1, R3, and R5.

The use of the index tables allows the hypervisor to save memory. For example, storing only a single copy of the rules for the firewall rules used by the group of workloads eliminates the memory needed to store a distinct copy of firewall rules for each workload. Storing an index table for each workload may use a much smaller amount of memory than storing the distinct copy of rules for each workload. Using less memory provides some advantages, such as the use of less memory to store distinct copies of rules for each workload may allow the hypervisor to store a larger amount of rules in the rules table.

System Overview

Figure 1:
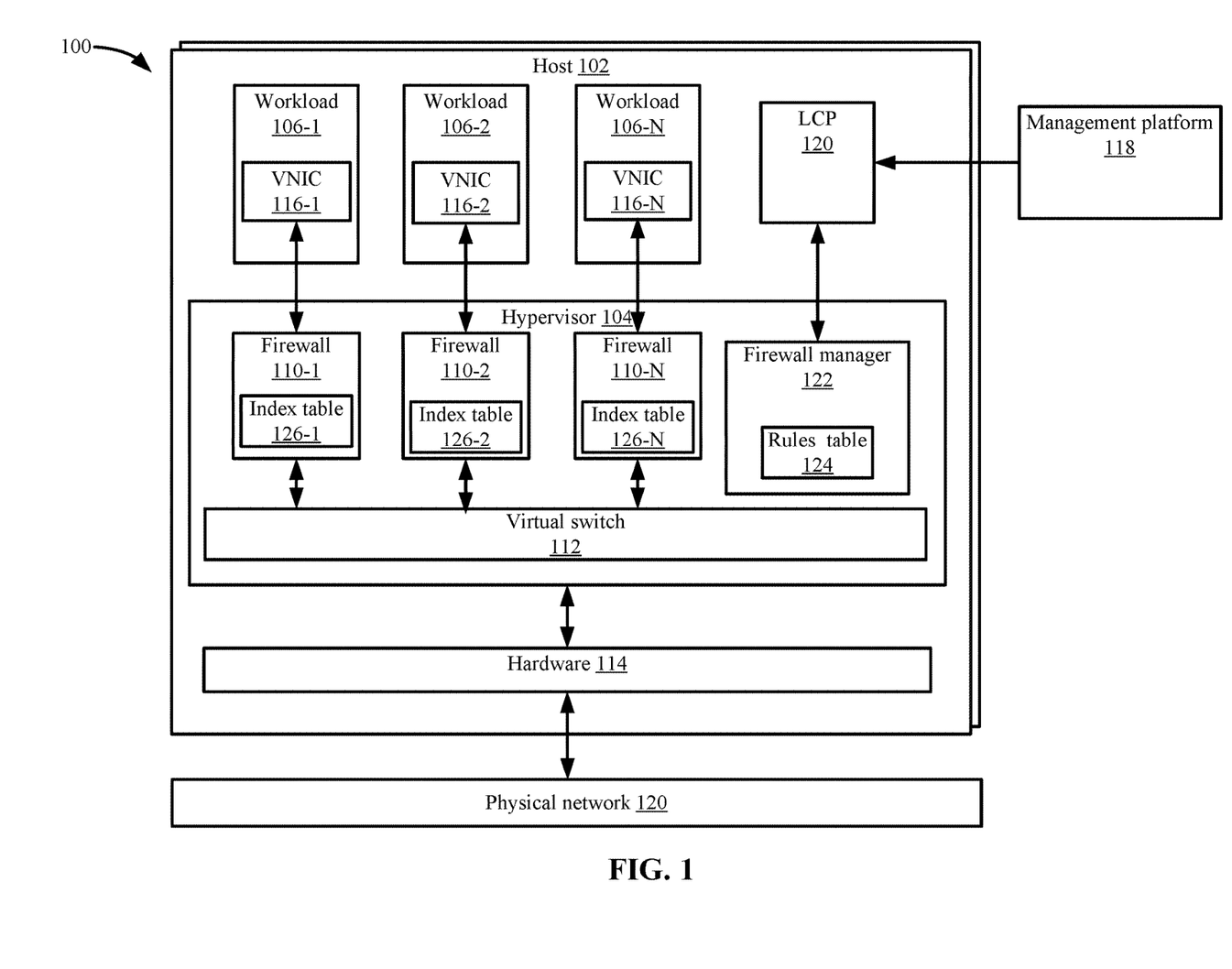
FIG. 1 depicts a simplified system for implementing a distributed firewall according to some embodiments.

FIG. 1 depicts a simplified system 100 for implementing a distributed firewall according to some embodiments. Hosts 102 may include workloads 106-1 to 106-N. Workloads may refer to virtual machines that are running on a respective host, but this is one example of a virtualized computing instance or compute node. Any suitable technology may be used to provide a workload. Workloads may include not only virtual machines, but also containers (e.g., running on top of a host operating system without the need for a hypervisor or separate operating system or implemented as an operating system level virtualization), virtual private servers, client computers, etc. The workloads may also be complete computation environments containing virtual equivalents of the hardware and software components of a physical computing system. Also, as used herein, the term hypervisor may refer generally to a software layer or component that supports the execution of multiple workloads including system-level software that supports name space containers.

Workloads 106-1 to 106-N may send and receive packets through virtual network interface cards (VNIC) 116-1 to 116-N. The packets may be sent through a virtual switch 112 in hypervisor 104 to a physical network interface card (PNIC) in hardware 114. Then, packets are routed through physical network 120. Also, packets are received from physical network 120 at the PNIC, and sent through virtual switch 112 to VNICs 116 of workloads 106.

Management platform 118 may be a platform that manages the virtual networks on host computing machines 102. For example, management platform 118 may centrally manage firewall rules that are distributed to different hosts 102.

A local controller plane (LCP) 120 may be a process that is running on hypervisor 104. LCP 120 receives the firewall rules for workloads 106 from management platform 118. For example, LCP 120 interacts with management platform 118 to retrieve the firewall rules. In some embodiments, LCP 120 is running in the user space of hypervisor 104; however, the implementation of LCP 120 may be different. LCP 120 processes the firewall rules to build rules table 124 and index tables 126-1 to 126-N, the processing of which will be described in more detail below.

Firewall manager 122 manages the configuration of the distributed firewall in hypervisor 104. For example, firewall manager 122 stores a central copy of all firewall rules in the memory of hypervisor 104, such as in a rules table 124. The structure and use of rules table 124 will be described in more detail below. Although LCP 120 and firewall manager 122 are described as being separate components, other configurations may be used, such as functions of both may be combined or distributed to other entities.

Instances of firewalls 110-1 to 110-N are configured for each respective workload 106-1 to 106-N. For example, each instance of distributed firewall 110 may be enforced in between VNIC 116 and virtual switch 112. However, firewall 110 may be situated at any point in a path of packets, such as at VNIC 116, or anywhere in between workload 106 and virtual switch 112. Firewall 110 intercepts packets sent from VNIC 116 before they reach virtual switch 112 and also intercepts packets from virtual switch 112 before they reach VNIC 116. Each respective workload 106 may have an associated firewall situated between VNIC 116 and virtual switch 112 although firewalls 110 may be placed at other positions.

Firewalls 110-1 to 110-N store index tables 126-1 to 126-N, respectively. Each index table 126 references specific firewall rules that apply to the respective workload 106. Those references are used to retrieve rules in rules table 124 when enforcing policies at firewalls 110. The structure of index table 126 and enforcement of policies will be described in more detail below.

Rules Distribution

Management platform 118 may distribute a copy of firewall rules for a group of workloads 106 running on hypervisor 104 of a host 102. In some embodiments, the copy of firewall rules is for all workloads 106 running on hypervisor 104. However, management platform 118 may provide different groups of firewall rules for groups of workloads 106 that are running on hypervisor 104. For example, a first group of workloads 106 on host 102 may have an associated first copy of firewall rules and a second group of workloads 106 on host 102 may have a second copy of firewall rules.

Figure 2:
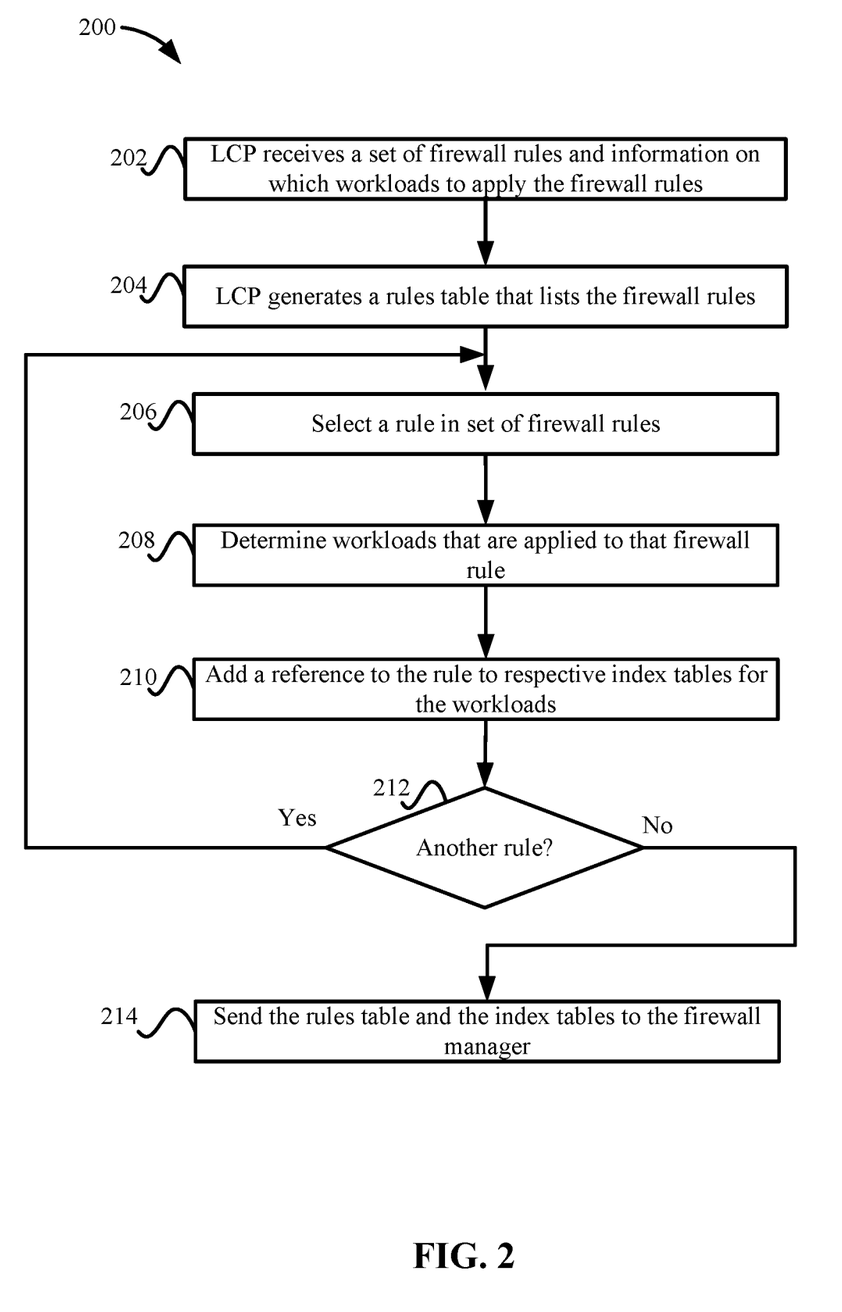
FIG. 2 depicts a simplified flowchart of a method for processing firewall rules according to some embodiments.

LCP 120 receives and processes the firewall rules for workloads 106 from management platform 118. LCP 120 reviews the rules and can generate index tables that reference each rule that is associated with a specific workload 106. FIG. 2 depicts a simplified flowchart 200 of a method for processing firewall rules according to some embodiments. At 202, LCP 120 receives rules and information on which workloads to apply to the rules. LCP 120 may receive only one copy of the all the rules. At 204, LCP 120 generates a rules table 124 that stores the rules. Rules table 124 may be a data structure, such as an index that refers to information for each of the firewall rules.

Figure 3A:
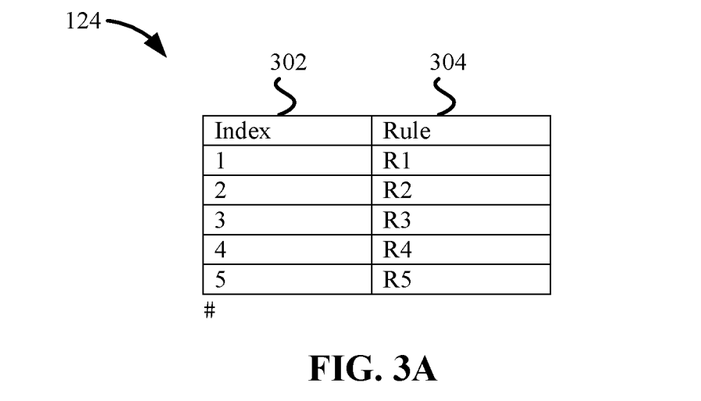
FIG. 3A shows an example of a rules table according to some embodiments.

FIG. 3A shows an example of a rules table according to some embodiments. A first column 302 may be an index and a second column 304 may store the information for the rule. In this example, the indices include #1, #2, ..., #5 and there are five rules R1, R2, ..., R5. The information for the rules may be stored in each entry in rules table 124 for each rule. For example, information for rule R1 is stored for index #1; the information for rule R2 is stored for index #2, etc. Although only one column for the rules is shown at 304, the information for the rules may be stored in different formats. For example, each rule may list any combination of information that can be used to apply the rule to a packet, such as a 5-tuple of a source Internet protocol (IP) address, a destination IP address, protocol used, a layer 4 (L4) source port, and a layer 4 destination port. The 5-tuple may be stored in different columns, such as the source address is stored in a first column, the destination address is stored in a second column, etc. The information for the rules may also include an action to perform if the rule applies to a packet, such as "allow" or "block". The allow action allows the packet to be sent or received by workload 106 and the block action does not send the packet from workload 106 or send the packet to workload 106. Other actions may also be appreciated.

Referring back to FIG. 2, at 206, LCP 120 selects a rule in the set of firewall rules. For example, the first rule R1 may be selected. Then, at 208, LCP 120 determines workloads that are applied to that firewall rule. In some embodiments, each rule may include a statement, such as an "apply to" statement that lists the workloads 106 in which the rules should be applied. Each workload 106 may be identified by a VNIC identifier and LCP 120 determines the VNIC identifier for each workload 106 in which the rule applies. Although VNIC identifiers are discussed, other identifying information for a workload may be used. For example, the rules may be applied per datacenter, per a cluster of hosts, per a grouping of workloads, per a workload identifier, etc. Then, at 210, LCP 120 adds a reference to each respective index table for the workloads for the rule.

At 212, LCP 120 determines if another rule is found in the set of rules. If so, the process reiterates to 206 where another firewall rule is selected. The process continues to determine workloads associated with the new rule. LCP 120 then adds a reference to the rule to the respective index tables for the workloads. Once finished, each index table 126 may include a set of references that reference a set of rules in rules table 124. Accordingly, when there are no more rules to analyze, at 214, LCP 120 sends rules table 124 and index tables 126-1 to 126-N to firewall manager 122.

Figure 3B:
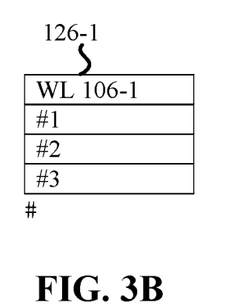
FIGS. 3B to 3D depict examples of index tables according to some embodiments.
Figure 3C:
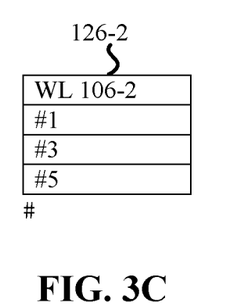
Figure 3D:
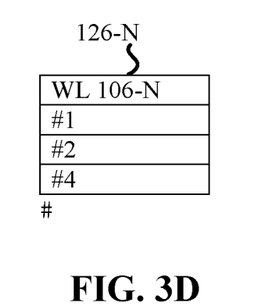

FIGS. 3B to 3D depict examples of index tables 126-1 to 126-N according to some embodiments. Rows of index tables 126-1 to 126-N may list references to the rules. For example, in FIG. 3B, for a workload 106-1, index table 126 stores references to rules R1, R2, and R3. Referring to rules table 124 in FIG. 3A, the indices for rules R1, R2, and R3 are #1, #2, and #3, respectively, and the indices may be used to retrieve the information for rules R1, R2, and R3 from rules table 124. In FIG. 3C, index table 126 lists references to rules R1, R3, and R5 for workload 106-2. The indices in index table 126 are #1, #3, and #5, and correspond to respective indices in rules table 124. Finally, in FIG. 3D, index table 126-N lists the rules for workload 106-N. These rules are R1, R2, and R4 and refer to the indices of #1, #2, and #4 in rules table 124. The references may be a pointer or other information that points to an entry in rules table 124. The reference for a rule includes less information than the information for the rule itself.

Distributed Firewall

Firewall manager 122 may be running in the kernel space of hypervisor 104. Once receiving rules table 124 from LCP 120, firewall manager 122 stores a copy of rules table 124 in the memory of hypervisor 104. In some embodiments, firewall manager 122 stores a single copy of rules table 124 in hypervisor 104 for the group of workloads 106.

Firewall manager 122 then stores a copy of each respective index table 126 in a respective firewall 110 for each respective workload 106. Each index table 126-1 to 126-N may identify a specific workload 106-1 to 106-N. For example, each index table 126 may reference a VNIC identifier for a respective workload 106. Firewall manager 122 uses the VNIC identifier for an index table 126 to store the index table for that firewall 110. Each firewall 110 then has an associated index table 126. For example, firewall 110-1 includes an index table 126-1, firewall 110-2 includes an index table 126-2, and so on. In some examples, logic for firewall 110 may be instantiated between VNIC 116 and a port of virtual switch 112. The rules are stored with the instantiation of firewall 110 between VNIC 116 and the port of virtual switch 112.

Figure 4:
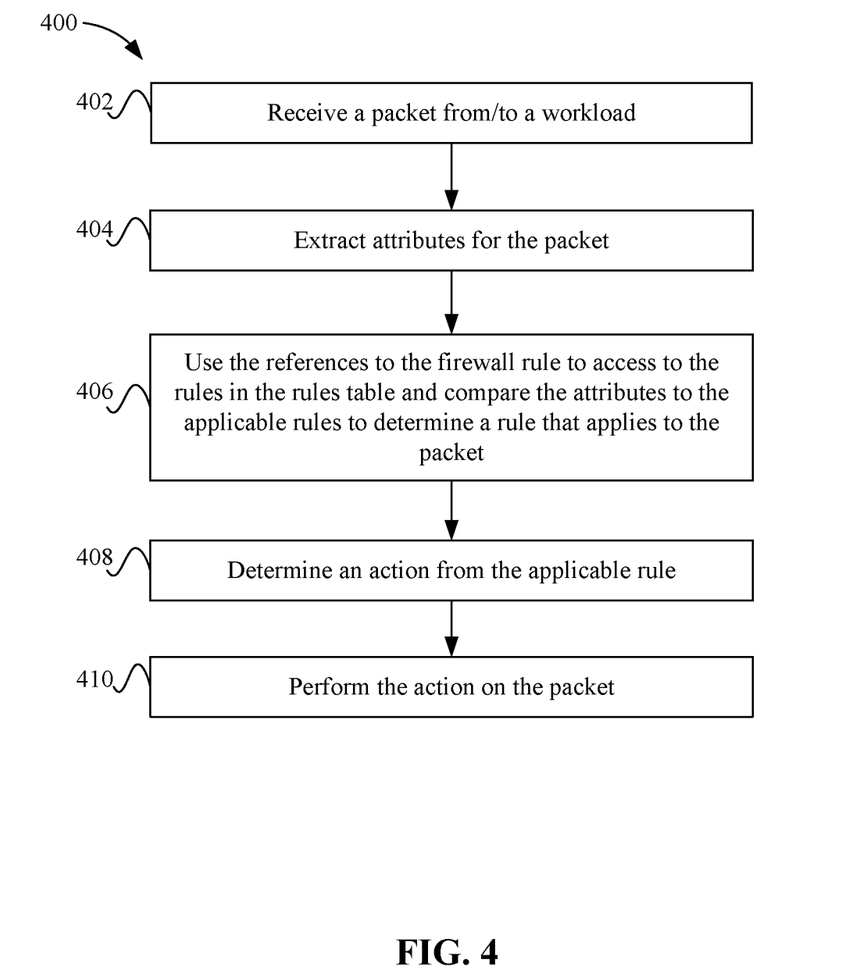
FIG. 4 depicts a simplified flowchart of a method for processing packets using a firewall according to some embodiments.

Once index tables 126 and rules table 124 have been stored, firewalls 110 may process packets for workloads 106. FIG. 4 depicts a simplified flowchart 400 of a method for processing packets using firewall 110 according to some embodiments. At 402, firewall 110 intercepts a packet that is being sent from workload 106 or is being sent to workload 106, such as the packet is intercepted between VNIC 116 and virtual switch 112. At 404, firewall 110 extracts one or more attributes for the packet. In some examples, the attributes may be associated with characteristics of workload 106, such as the 5-tuple described above; however, other combinations of attributes may be used. The attributes may be from different layers, such as attributes from layer 2 to layer 4.

At 406, firewall 110 uses the references for the rules in index table 126 to access to the rules from rules table 124 and compares the attributes to the applicable rules in index table 126 to determine a rule that applies to the packet. For example, for workload 106-1, firewall 110 retrieves references #1, #2, and #3 to rules R1, R2, and R3. Firewall 110 uses the references to access rules R1, R2, and R3 in rules table 124. For example, information for rules R1, R2, and R3 are accessed at indices #1, #2, and #3 in rules table 124.

Firewall 110 may access rules from rules table 124 in different ways. In some examples, firewall 110 communicates with firewall manager 122 by sending the reference to firewall manager 122, which retrieves the rule and sends information for the rule to firewall 110. In other examples, firewall 110 uses the reference to retrieve the applicable rule from rules table 124 without communicating with firewall manager 122.

Firewall 110 may use different methods to perform the comparison. In some examples, firewall 110 enforces the rules from a top to bottom ordering. For each packet, firewall 110 checks the top rule listed in index table 126 before moving down to the subsequent rules listed in index table 126. The first rule listed in index table 126 that matches the attributes is enforced using this policy. The last rule that is listed at the bottom of index table 126 may be a default rule that is enforced on the packet if no other rule has attributes that match the attributes of the packet. The default rule may not specify any particular attributes so that the default rule can match all packets. Although this top to bottom ordering policy is described, other methods may be used. For example, firewall 110 may determine all the rules that match the attributes and then select the one of the rules based on a ranking system.

Using the above process, firewall 110 may start with a first rule R1 listed in index table 126, access rule R1 in rules table 124 using the reference #1, and then compare the attributes of the packet to the attributes listed for rule R1. In some embodiments, firewall 110 may access a source and destination from columns in rules table 124, and compare the source and destination of the packet to the source and destination of the rule. If the attributes listed for rule R1 do not match the attributes of the packet, then firewall 110 proceeds to determine if attributes for rule R2 match the attributes of the packet. If the attributes for rule R2 do not match the attributes of the packet, then rule R3 is enforced as the default rule.

At 408, once firewall 110 determines the applicable rule for the packets, firewall 110 determines an action for the rule. For example, the rule may list an action to perform, such as an action of allow the packet or block the packet. Then, at 410, firewall 110 performs the action on the packet, which could route the packet to workload 106 or to virtual switch 112 if the packet is allowed, or just block the packet from being sent from or to workload 106.

To improve the speed of filtering packets, firewall 110 may use a connection table together with the firewall rules. A connection table may store network connections in a fast lookup data structure such like hash table. Each network connection may be a unique identifier, such as a 5-tuple, based on packet attributes. If the first packet of a connection is allowed by the firewall rules, firewall 110 inserts an instance of the connection into the connection table. The following packets in the same connection may be allowed as well. Firewall 110 may look up packets in the connection table before attempting to match the firewall rules. When a packet does not match any existing connections in the connection table, firewall 110 then compares the packet to the firewall rules in index table 126.

Accordingly, hypervisor 104 uses less memory to store the rules. For example, hypervisor 104 may only store one copy of firewall rules R1 to R5, which uses memory to store five rules. However, workloads 106-1 to 106-N may each have three applicable rules that are used totaling nine rules. If an individual copy of each rule is stored for workloads 106-1 to 106-N, memory is used to store nine rules, which uses more memory than storing five rules. Thus, some embodiments eliminate the storage requirement for four rules in this example. For example, rule R1 does not need to be stored three times for workload 106-1, 106-2, and 106-N. Similarly, multiple copies of rule R2 do not need to be stored for workload 106-1, 106-N, and multiple copies of rule R3 do not need to be stored for workloads 106-1 and 106-2. The storage of individual copies of rules for each workload 106 is replaced by index tables and the storage of index tables 126 use significantly less space than the storage for individual sets of the rules for each workload 106 because storing the indices to rules uses less storage than the content of the rules themselves.

At some points, management platform 118 may update the firewall rules. LCP 120 receives a new copy of all the firewall rules for a group of workloads 106 that are running on hypervisor 104. Then, LCP 120 recomputes index tables 126-1 to 126-N for each workload 106-1 to 106-N. Additionally, LCP 120 computes a new rules table 124. LCP 120 then sends the new index tables 126 and new rules table 124 to firewall manager 122. While LCP 120 generated the new index tables 126 and new rules table 124, firewall manager 122 still uses existing index tables 126-1 to 126-N and the existing rules table 124. LCP 120 creates a new set of index tables 126 and rule table 124 to allow the distributed firewall to operate while the update is taking place. When the new index tables 126 and new rule table 124 are ready, firewall manager 122 can switch from using the previous index tables to new index tables and from the previous rules table to the new rules table.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the disclosure(s). In general, structures and functionality presented as separate components in exemplary configurations may be implemented as a combined structure or component. Similarly, structures and functionality presented as a single component may be implemented as separate components.

Some embodiments described herein can employ various computer-implemented operations involving data stored in computer systems. For example, these operations can require physical manipulation of physical quantities—usually, though not necessarily, these quantities take the form of electrical or magnetic signals, where they (or representations of them) are capable of being stored, transferred, combined, compared, or otherwise manipulated. Such manipulations are often referred to in terms such as producing, identifying, determining, comparing, etc. Any operations described herein that form part of one or more embodiments can be useful machine operations.

Further, one or more embodiments can relate to a device or an apparatus for performing the foregoing operations. The apparatus can be specially constructed for specific required purposes, or it can be a general purpose computer system selectively activated or configured by program code stored in the computer system. In particular, various general purpose machines may be used with computer programs written in accordance with the teachings herein, or it may be more convenient to construct a more specialized apparatus to perform the required operations. The various embodiments described herein can be practiced with other computer system configurations including handheld devices, microprocessor systems, microprocessor-based or programmable consumer electronics, minicomputers, mainframe computers, and the like.

Yet further, one or more embodiments can be implemented as one or more computer programs or as one or more computer program modules embodied in one or more non-transitory computer readable storage media. The term non-transitory computer readable storage medium refers to any data storage device that can store data which can thereafter be input to a computer system. The non-transitory computer readable media may be based on any existing or subsequently developed technology for embodying computer programs in a manner that enables them to be read by a computer system. Examples of non-transitory computer readable media include a hard drive, network attached storage (NAS), read-only memory, random-access memory, flash-based nonvolatile memory (e.g., a flash memory card or a solid state disk), a CD (Compact Disc) (e.g., CD-ROM, CD-R, CD-RW, etc.), a DVD (Digital Versatile Disc), a magnetic tape, and other optical and non-optical data storage devices. The non-transitory computer readable media can also be distributed over a network coupled computer system so that the computer readable code is stored and executed in a distributed fashion.

These and other variations, modifications, additions, and improvements may fall within the scope of the appended claims(s). As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The above description illustrates various embodiments of the present disclosure along with examples of how aspects of the present disclosure may be implemented. The above examples and embodiments should not be deemed to be the only embodiments, and are presented to illustrate the flexibility and advantages of the present disclosure as defined by the following claims. Based on the above disclosure and the following claims, other arrangements, embodiments, implementations and equivalents may be employed without departing from the scope of the disclosure as defined by the claims.

What is claimed is:

1. A method of performing firewall operations on a host computer executing a plurality of machines for which firewall rules need to be enforced on the host computer, the method comprising:
   at the host computer:
   receiving a plurality of firewall rules at least some of which are applicable to two or more machines executing on the host;
   storing one copy of the plurality of firewall rules on the host computer;
   generating, for each particular machine, an index table that has an index to each received, stored firewall rule that should be enforced for the particular machine;
   providing the index table to a particular firewall executing on the host computer for each particular machine to use to identify the firewall rules to enforce for the particular machine and to retrieve the identified firewall rules while process packets for the particular machine, said index tables allowing the host computer to store only one copy of the received firewall rules for the plurality of machines,
   wherein generating the index table for each particular machine comprises iteratively examining each received firewall rule to determine whether the firewall rule is applicable to the particular machine and adding an index to the firewall rule to the particular machine's index table when the rule is determined to be applicable to the particular machine.

2. The method of claim 1, wherein each firewall rule index identifies a location of the firewall rule in a firewall rule storage that is used to store the firewall rules.

3. The method of claim 1, wherein receiving the plurality of firewall rules comprises receiving the plurality of firewall rules from a management platform.

4. The method of claim 1, wherein the receiving, storing, generating and providing are performed by a local control plane (LCP) that executes on the host computer.

5. The method of claim 4, wherein storing the plurality of firewall rules comprises storing the plurality of firewall rules in a rule table of a firewall manager that executed on the host computer.

6. The method of claim 5, wherein the firewall manager is part of a hypervisor that executes on the host computer.

7. The method of claim 1, wherein for each particular machine, the firewall rules are identified and retrieved as packets traverse between the particular machine and a virtual switch executing on the host computer.

8. The method of claim 7, wherein for the plurality of machines, a plurality of firewalls executes on the host computer, use the index tables to identify the firewall rules applicable to their respective machines as packets traverse between their particular machines and the virtual switch, and retrieve the firewall rules using indices identified from their respective index tables.

9. The method of claim 8, each firewall identifying packets as the packets traverse between a virtual network interface card (VNIC) of the firewall's associated machine and a port of the virtual switch.

10. A non-transitory machine readable medium storing a program which when executed by at least one processing unit performs firewall operations on a host computer executing a plurality of machines for which firewall rules need to be enforced on the host computer, the program comprising sets of instructions for:
at the host computer:
receiving a plurality of firewall rules at least some of which are applicable to two or more machines executing on the host;
storing one copy of the plurality of firewall rules on the host computer;
generating, for each particular machine, an index table that has an index to each received, stored firewall rule that should be enforced for the particular machine;
providing the index table to a particular firewall executing on the host computer for each particular machine to use to identify the firewall rules to enforce for the particular machine and to retrieve the identified firewall rules while process packets for the particular machine, said index tables allowing the host computer to store only one copy of the received firewall rules for the plurality of machines,
wherein the set of instructions for generating the index table for each particular machine comprises sets of instructions for iteratively examining each received firewall rule to determine whether the firewall rule is applicable to the particular machine and adding an index to the firewall rule to the particular machine's index table when the rule is determined to be applicable to the particular machine.

11. The non-transitory machine readable medium of claim 10, wherein each firewall rule index identifies a location of the firewall rule in a firewall rule storage that is used to store the firewall rules.

12. The non-transitory machine readable medium of claim 10, wherein the set of instructions for receiving the plurality of firewall rules comprises a set of instructions for receiving the plurality of firewall rules from a management platform.

13. The non-transitory machine readable medium of claim 10, wherein the sets of instructions for receiving, storing, generating and providing are performed by a local control plane (LCP) that executes on the host computer.

14. The non-transitory machine readable medium of claim 13, wherein the set of instructions for storing the plurality of firewall rules comprises a set of instructions for storing the plurality of firewall rules in a rule table of a firewall manager that executed on the host computer.

15. The non-transitory machine readable medium of claim 14, wherein the firewall manager is part of a hypervisor that executes on the host computer.

16. The non-transitory machine readable medium of claim 10, wherein for each particular machine, the firewall rules are identified and retrieved as packets traverse between the particular machine and a virtual switch executing on the host computer.

17. The non-transitory machine readable medium of claim 16, wherein for the plurality of machines, a plurality of firewalls executes on the host computer, use the index tables to identify the firewall rules applicable to their respective machines as packets traverse between their particular machines and the virtual switch, and retrieve the firewall rules using indices identified from their respective index tables.

18. The non-transitory machine readable medium of claim 17, each firewall identifying packets as the packets traverse between a virtual network interface card (VNIC) of the firewall's associated machine and a port of the virtual switch.

* * * * *